V. RAMBAUD.
ANIMAL CATCHER.
APPLICATION FILED OCT. 7, 1908.
985,206.
Patented Feb. 28, 1911.
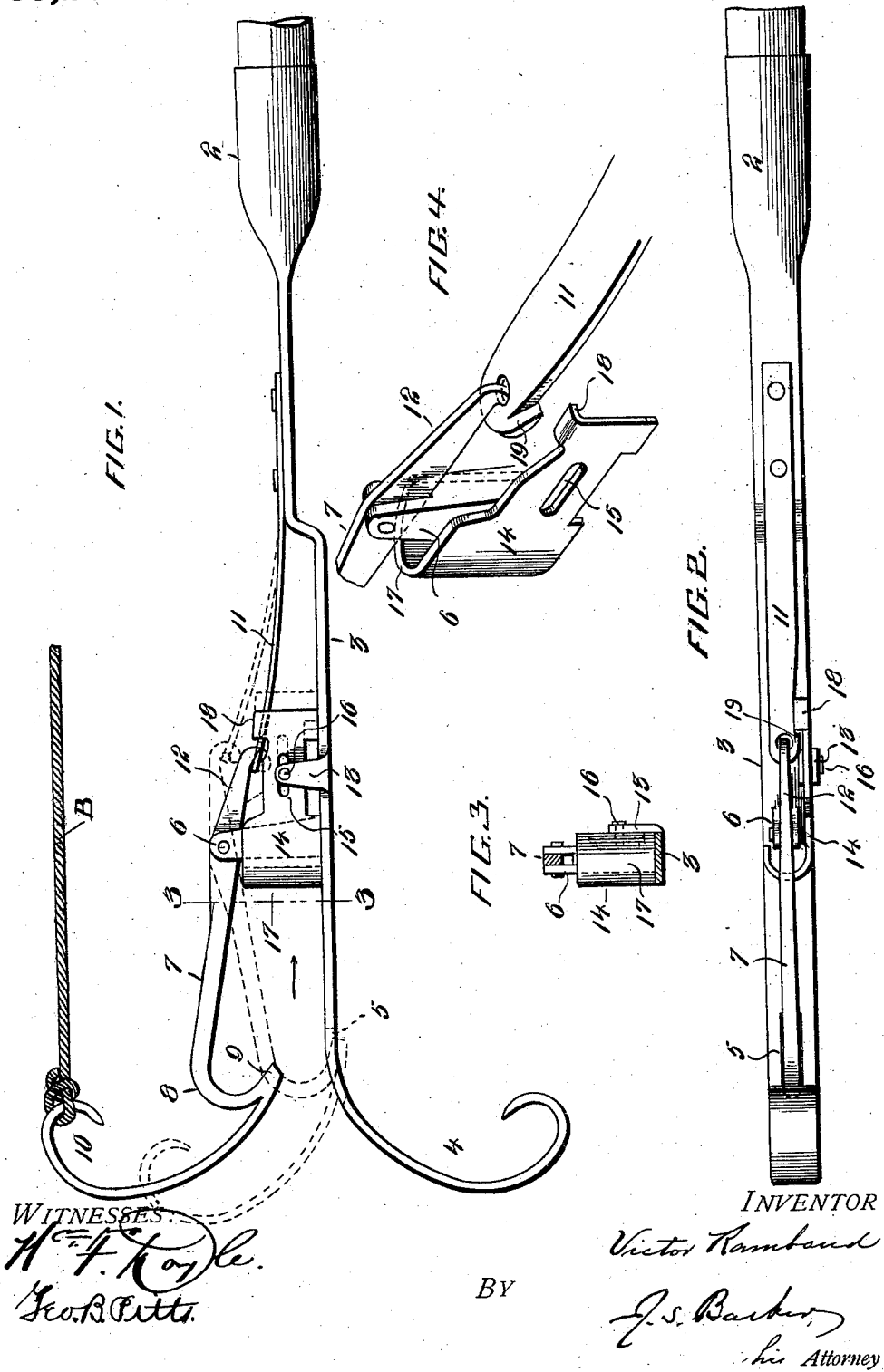
WITNESSES
INVENTOR
Victor Rambaud
BY
his Attorney

UNITED STATES PATENT OFFICE.

VICTOR RAMBAUD, OF BITTER CREEK, WYOMING.

ANIMAL-CATCHER.

985,206.

Specification of Letters Patent. Patented Feb. 28, 1911.

Application filed October 7, 1908. Serial No. 456,680.

*To all whom it may concern:*

Be it known that I, VICTOR RAMBAUD, a citizen of the United States, residing at Bitter Creek, in the county of Sweetwater and State of Wyoming, have invented a new and useful Improvement in Animal-Catchers, of which the following is a specification.

My invention relates to implements employed for catching animals by engaging with the legs thereof, they being largely used by shepherds and care takers of sheep, though they are equally well adapted for catching other animals.

It has for its object to produce an implement of this kind which, when once made to engage with the leg of an animal will securely hold the latter, resisting all attempts of the animal to free itself by kicking or other movements.

In the accompanying drawings, Figure 1 is a side view of an implement embodying my improvements. Fig. 2 is a plan view of the same. Fig. 3 is a sectional view taken on the line 3—3 of Fig. 1. Fig. 4 is a detail view in perspective, and enlarged as compared with the other views, showing the catch and some of the parts of the implement immediately adjacent thereto.

The implement herein shown is adapted to be applied to the end of a handle or staff, being at its rear or inner end provided with a socket 2 or other means of attachment. A plate 3, either integral with the socket 2 or made separate therefrom and attached thereto, as preferred, extends forward and constitutes the base or the support element of the tool or implement. Its outer end is curved, as indicated at 4, to assist in guiding the article into engagement with the leg of the animal intended to be caught, as is usually done in this class of devices. A post or standard 6 rises from the plate 3 and is placed approximately midway between its ends, and upon this is pivoted the movable jaw or arm 7 of the device. That portion of the bar or plate 3 that extends forward beyond the standard 6 constitutes the stationary jaw or arm of the implement, and when the movable jaw is swung down into the closed position indicated by the dotted lines in Fig. 1 there is a space inclosed by the jaws or arms in which the leg of an animal may be confined.

The outer end of the pivoted and movable jaw is curved as indicated at 8, and its extreme end 9 is adapted, when swung down or toward the other jaw, to pass through an aperture 5 provided therefor in the plate 3. I prefer to provide it with a relatively large loop into which a cord B may be secured for opening the jaw, this cord extending backward along the staff so as to be within convenient reach of the user of the device. The loop 10 is so shaped as to constitute an inclined guide leading toward the opening into the space between the two arms, 3 and 7, it and the curved end 4 of the plate 3 serving to direct the implement when thrust forward into engagement with an animal's leg causing the latter to enter the space between the point 9 of the movable jaw and the opposing face of the stationary one.

A spring 11 is attached to the base plate 3 and engages with the inner end of the arm 12 of the pivoted jaw 7, which, as will be seen, is a lever of the first order. The spring thus acts upon the lever to the greatest of advantage, permitting a relatively long and weak spring to be employed, thereby reducing the liability of breakage or deterioration from use. As shown in the drawings I prefer that the connection between the spring and the end of the arm 12 should be constant, the end of the arm being represented as of hook shape and passing through an aperture in the end portion of the spring. The spring 11 is preferably a flat leaf spring as represented in the drawings and is supported so as to lie substantially parallel with the jaws of the implement and in rear of the movable jaw 7 which it actuates.

In order to hold the loop or catcher in open position, indicated in full lines, Fig. 1, which is the position the parts are caused to assume when an animal is to be caught, I employ a sliding catch 14 formed with a hook 18 adapted to engage with an inclined-faced offset 19 of the spring and hold it under tension when desired. This catch device 14 is movable and is supported and directed in its movements by the standards 6 and 13. The catch is preferably slotted as represented at 15, and a pin 16 carried by the standard 13 lies in the slot and limits the movements of the catch. The front portion 17 of the movable catch piece extends forward beyond the support or standard 6, into a position to be engaged by the leg of an animal as it enters the space between the arms 3 and 7 of the hook. This engagement of the leg with the sliding catch piece operates to move the latter backward, disengaging or tripping the catch 18 from the spring allowing the latter to throw the movable arm or jaw toward the stationary one and into locking position.

In order to release the leg of the animal the outer end of the arm 7 is drawn backward, as by means of the cord B, putting the spring under tension. When the parts are in these positions the slide 14 is moved forward into position to cause the hook or catch 18 thereof to engage with the spring when the movable arm or jaw may be released, and the catch allowed to hold the parts in open position.

By providing the spring with the offset contact piece 19, the upper face of which is inclined, the ready engagement of the catch therewith and its release therefrom is facilitated, the spring and jaw being perfectly free to move after the disengagement has been effected.

What I claim is:

1. In an animal catching implement, the combination of the jaws arranged to define a leg-receiving opening, one of the jaws being a lever of the first order, a spring having a constant connection with the end of the inner arm of the said lever jaw and extending beyond the same, and a sliding catch device arranged to engage with the spring adjacent to its connection with the jaw for holding the spring under tension and the lever jaw in open position, arranged to be tripped by the leg of the animal as it enters the opening between the jaws.

2. In an animal catching implement, the combination of a bar adapted to be secured to the end of a staff, the outer end of which is turned outward so as to constitute one of the leg-holding jaws, a standard rising from the bar, a jaw pivoted to the said standard intermediate between its ends, the outer end of the pivoted jaw being curved, a spring connected with the end of the inner arm of the pivoted jaw, a sliding catch located between the jaws and arranged to engage with the spring to hold it under tension, and a guide carried by the said bar for supporting the catch and directing its movements.

VICTOR RAMBAUD.

Witnesses:
T. S. TALIOFERRO, Jr.,
LAURA E. SMITH.

---

Copies of this patent may be obtained for five cents each, by addressing the "Commissioner of Patents, Washington, D. C."